United States Patent [19]
Okamoto

[11] Patent Number: 5,369,607
[45] Date of Patent: Nov. 29, 1994

[54] FLOATING-POINT AND FIXED-POINT ADDITION-SUBTRACTION ASSEMBLY

[75] Inventor: Fuyuki Okamoto, Tokyo, Japan
[73] Assignee: NEC Corporation, Tokyo, Japan
[21] Appl. No.: 3,491
[22] Filed: Jan. 12, 1993
[30] Foreign Application Priority Data
   Feb. 27, 1992 [JP] Japan ................. 4-041634
[51] Int. Cl.⁵ ............................................. G06F 7/38
[52] U.S. Cl. .................................... 364/748; 364/768
[58] Field of Search ................................ 364/748, 768
[56] References Cited

U.S. PATENT DOCUMENTS

| | | | |
|---|---|---|---|
| 4,511,990 | 4/1985 | Hagiwara et al. | 364/748 |
| 4,620,292 | 10/1986 | Hagiwara et al. | 364/748 |
| 4,999,803 | 3/1991 | Turrini et al. | 364/748 |
| 5,136,536 | 8/1992 | Ng | 364/748 |
| 5,146,419 | 9/1992 | Miyoshi et al. | 364/748 |
| 5,222,037 | 6/1993 | Taniguchi | 364/748 |

Primary Examiner—Stephen M. Baker
Assistant Examiner—Emmanuel Moise
Attorney, Agent, or Firm—Leydig, Voit & Mayer

[57] ABSTRACT

Apparatus for use in a floating-point and fixed-point adder-subtractor assembly. The apparatus includes a comparator and selector circuit disposed prior to an adder-subtracter for determining a larger and smaller operand prior to the addition and subtraction operation. The comparator and selector circuit inputs the larger operand into a first predetermined input of the adder-subtracter and the smaller operand into a second predetermined input of the adder-subtracter. Additionally, first and second selector circuits may be provided for multiplexing first and second fixed point data operands into the first and second inputs of the adder-subtracter, respectively. A shifter is provided for shifting at least one of the operands prior to inputting the operand into the adder-subtracter for selectively performing a position alignment. Accordingly, a simplified structure provides fixed-point and floating-point data addition-subtraction in a highly efficient manner.

4 Claims, 5 Drawing Sheets

FIG. 1
(PRIOR ART)

$$2^5 \times 1.101011$$
$$-) \ 2^5 \times 1.101000$$
$$\overline{2^5 \times 0.000011}$$

↓ NORMALIZATION: 5-BIT LEFT-SHIFTING $$2^0 \times 1.100000$$

FIG. 2

$$2^5 \times 1.001011$$
$$-) \ 2^4 \times 1.110000$$

↓ POSITION ALIGNMENT: 1-BIT RIGHT-SHIFTING $$2^5 \times 1.001011$$
$$-) \ 2^5 \times 0.111000$$
$$\overline{2^5 \times 0.010011}$$

↓ NORMALIZATION: 2-BIT LEFT-SHIFTING $$2^3 \times 1.001100$$

FLOATING-POINT AND FIXED-POINT ADDITION-SUBTRACTION ASSEMBLY

FIELD OF THE INVENTION

The present invention relates to a method for a floating-point addition-subtraction and an adder-subtracter assembly, and more particularly to a method for a floating-point addition-subtraction and a floating-point adder-subtracter assembly in which a floating-point addition or subtraction is carried out by a fewer number of barrel shifter and hence of a higher speed over a conventional method or assembly.

BACKGROUND OF THE INVENTION

A conventional adder-subtracter assembly used for a digital computer typically operates sequentially in four steps: comparison of both the operands in magnitude and subtraction of exponents thereof; right-shifting one of the operands for a position alignment; adding-subtracting the fractions of both the operands; and shifting for a normalization of the result obtained by the addition-subtraction.

Figure 1:
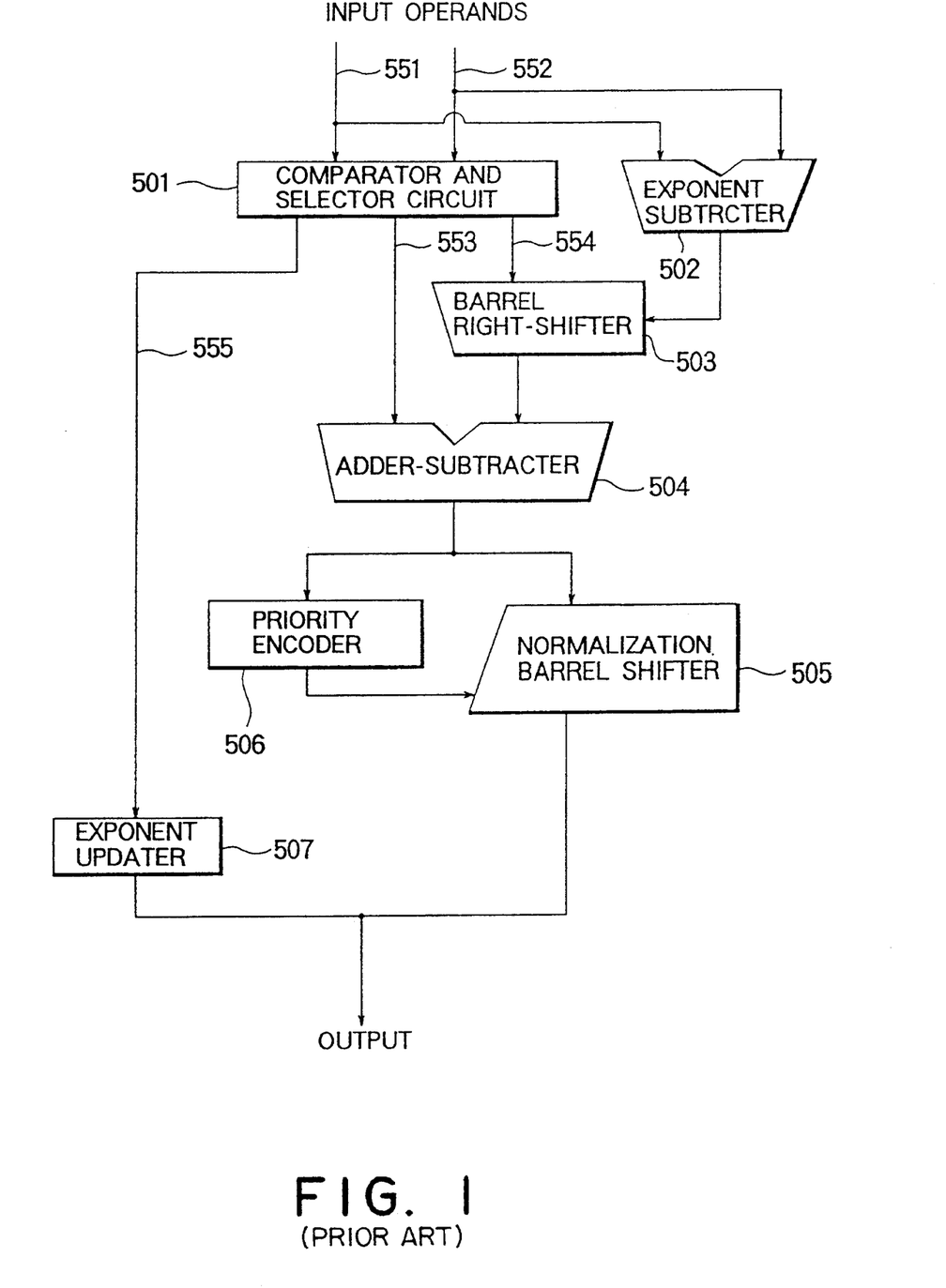
FIG. 1 is a block diagram showing a basic configuration of a conventional floating-point adder-subtracter assembly.

A conventional adder-subtracter assembly will be described with reference to the drawings. FIG. 1 shows a basic configuration of a conventional floating-point adder-subtracter assembly. In the same drawing, input operands 551 and 552 are compared to each other in their magnitude in a comparator and selector circuit 501, through which the fraction 554 of the smaller operand is supplied to a barrel right-shifter 503. The barrel right-shifter 503 functions for right-shifting the fraction 554 of the smaller operand for a position alignment of both the operands. The signal for the shift amount is supplied from an exponent subtracter 502 as a difference between the exponents of both the operands.

After the position alignment, the output of the barrel right-shifter 503 is added to or subtracted from the fraction 553 of the larger operand in an adder-subtracter 504, the output of which is then normalized in a normalization barrel shifter 505 for generating an output fraction expressed as 1.xxx . . . . In order to generate the normalization signal, a priority encoder 506 encodes the position of "1" appearing in the most significant bit of the output of the adder-subtracter 504. The normalization barrel shifter 505 operates for shifting in an amount corresponding to the output of the priority encoder 506.

The exponent is updated or adjusted in an exponent updater 507. The update of exponent is carried out by adding or subtracting the shift amount in the normalization shift to or from the exponent 555 of the larger operand supplied by the comparator and selector circuit 501. Both the outputs of the barrel shifter 505 and the exponent updater 507 as combined constitute the final output of the floating-point adder-subtracter assembly.

The floating-point adder-subtracter assembly as described above can be used also for an addition-subtraction of fixed-point operands. In this case, the adder-subtracter assembly is controlled in such a way that the adding or subtracting operation is carried out in the adder-subtracter 504 similarly to the addition-subtraction of the fraction as described above, and the remaining components or blocks in the adder-subtracter assembly function only for passing the data without any processing. The conventional adder-subtracter assembly is described in detail in "Computer Arithmetic PRINCIPLES, ARCHITECTURE, AND DESIGN" by Kai Hwang.

The conventional floating-point adder-subtracter assembly as described above has a drawback in which the addition-subtraction requires a large amount of time, since the operation includes in series among other procedures two barrel shifts, namely, a barrel right-shift for a position alignment and a barrel shift for a normalization, the barrel shifts each requiring a large amount of time.

SUMMARY OF THE INVENTION

An object of the present invention is to provide a method for a floating-point addition-subtraction and a floating-point adder-subtracter assembly in which an addition-subtraction is carried out at a higher speed than a conventional floating-point adder-subtracter method or assembly.

Accordingly, the present invention provides a floating-point and fixed-point adder-subtractor assembly including a comparator and selector circuit comparing a first operand including a first exponent and a first fraction with a second operand including a second exponent and a second fraction, respectively, for determining which of the first and second operands has a larger magnitude. An exponent subtracter is included for calculating a difference between the first and second exponents. A first barrel shifter shifts one of the first and second fractions in an amount equal to the difference to obtain a first position alignment of the first and second fractions. A first adder-subtracter adds/subtracts the first and second fractions to generate a third fraction after the first and second fractions are positioned-aligned by the first barrel shifter. A first one-bit shifter shifts the third fraction in an amount equal to or less than one bit for a first normalization. A first selection circuit selectively outputs a first fixed-point data or one of the first and second fractions supplied from the comparator and selector circuit. A second selection circuit selectively outputs a second fixed-point data or the other of the first and second fractions not supplied to the first selection circuit. A second one-bit shifter for shifting the one of the first and second fractions supplied from the first selection circuit in an amount equal to the difference for a second position alignment of the first and second fractions. A second adder-subtracter adds/subtracts the first and second fractions to generate a fourth fraction after the first and second fractions are positioned-aligned by the second one-bit shifter. The second adder-subtracter adds/subtracts the first fixed-point data and second fixed-point data in a fixed-point adding-subtracting mode. A second barrel shifter shifts the fourth fraction in an amount corresponding to the fourth fraction for a second normalization. A third selection circuit selects one of the outputs of the first one-bit shifter and second barrel-shifter, and an exponent updater generates a third exponent for the fourth fractions.

According to a first aspect of the present invention there is provided a method for a floating-point addition-subtraction including steps of: deciding a larger operand and a smaller operand by comparing the two operands in magnitude, the larger and smaller operands having first data including a first exponent and a first fraction and second data including a second exponent and a second fraction, respectively; calculating a difference between the first and second exponents; deciding whether the addition-subtraction is a first case in which the difference of the exponents is equal to or less than one and the addition-subtraction is a true subtraction or a second case different from the first case.

In the first case, the method of the present invention includes further steps of: shifting one of the first and second fraction equal to or less than one bit for a position alignment of the first and second fractions; then adding-subtracting the first and second fractions for generating a third fraction; and barrel shifting the third fraction for a normalization. Otherwise, in the second case, the method of the present invention includes alternative further steps of: barrel shifting one of the first and second fractions for a position alignment of the first and second fractions; then adding-subtracting the first and second fraction for generating a fourth fraction; and shifting the fourth fraction equal to or less than one bit for a normalization.

According to a second aspect of the present invention there is provided a floating-point adder-subtracter assembly comprising: a comparator and selector circuit for deciding a larger operand and a smaller operand by comparing the two operands in magnitude, the larger and smaller operands having first data including a first exponent and a first fraction and second data including a second exponent and a second fraction, respectively; an exponent subtracter for calculating a difference between said first and second exponents; a first barrel shifter for shifting one of the first and second fractions in an amount equal to the difference for a first position alignment of the first and second fractions; a first adder-subtracter for adding-subtracting the first and the second fractions for generating a third fraction after the first and second fractions are position-aligned by the first barrel shifter; a first one-bit shifter for shifting the third fraction in an amount equal to or less than one bit for a first normalization; a second one-bit shifter for shifting one of the first and second fractions in an amount equal to the difference for a second position alignment of the first and second fractions; a second adder-subtracter for adding-subtracting the first and second fractions for generating a fourth fraction after the first and second fractions are position-aligned by the second one-bit shifter; a second barrel shifter for shifting the fourth fraction in an amount corresponding to the fourth fraction for a second normalization; a selection circuit for selecting one of the outputs of the first one-bit shifter and the second barrel shifter; and an updater for adjusting one of the first and second exponents responsive to the output of one of the first one-bit shifter and the second barrel shifter.

According to the method for a floating-point addition-subtraction and the floating-point adder-subtracter assembly of the present invention, the addition-subtraction is carried out in separate flows depending on two conditions. In each of the two conditions, the shift amount either in the position alignment shift or in the normalization shift is equal to or less than one, so that only one barrel shifting operation is sufficient for the whole operation in a floating addition-subtraction. Hence, number of barrel shifting operation is reduced by one as compared to the conventional floating-point addition-subtraction requiring two barrel shifting operations, thereby reducing the amount of time required for addition-subtraction.

BRIEF DESCRIPTION OF THE DRAWINGS

Other and further objects, features and advantages of the present invention will be more apparent from the following description referring to the accompanying drawings in which.

DESCRIPTION OF THE PREFERRED EMBODIMENTS

Before describing embodiments of the present invention, the normalization shift operation in a floating-point addition-subtraction will be described for the ease of understanding. In general, shifting a fraction more than one bit is carried out for a normalization operation in two cases. In case other than the two cases, shifting a fraction in an amount of one bit or less is sufficient for a normalization operation.

Figure 2:
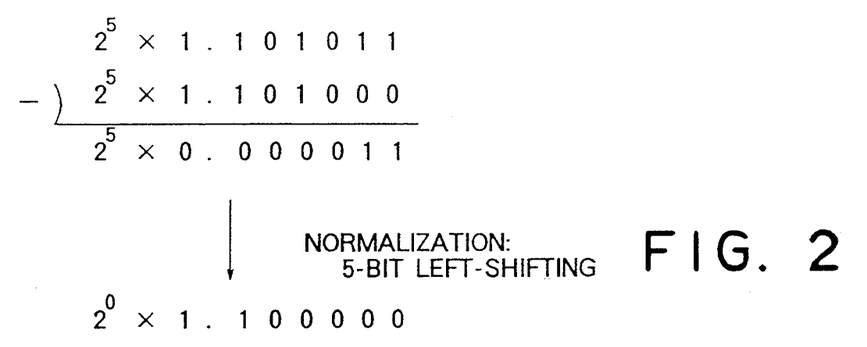
FIG. 2 and 3 are explanatory equations each for showing a true subtraction procedure in the adder-subtracter assembly of FIG. 1.

One of the two cases is such that the addition-subtraction is a "true subtraction" and the exponents of both the operands are equal to each other. Such a case is shown in FIG. 2 as an example, in which the exponents of both the operands are equal to each other (five in this example) and a left-shifting operation for more than one bit (five bits in this example) is carried out for a normalization due to the final result having an exponent of zero.

The "true subtraction" as used in this text is meant by a subtraction of two operands of the same sign and an addition of the operands of the opposite sign. Namely, for example, addition of a number (+5) and a number (−6) is a "true subtraction", while a subtraction of a number (−6) from a number (+5) is a "true addition", the numbers being expressed in a decimal system for a matter of convenience. The "true subtraction" or the "true addition" is different from an "instruction of subtraction" or an "instruction of addition" in an instruction code.

Figure 3:
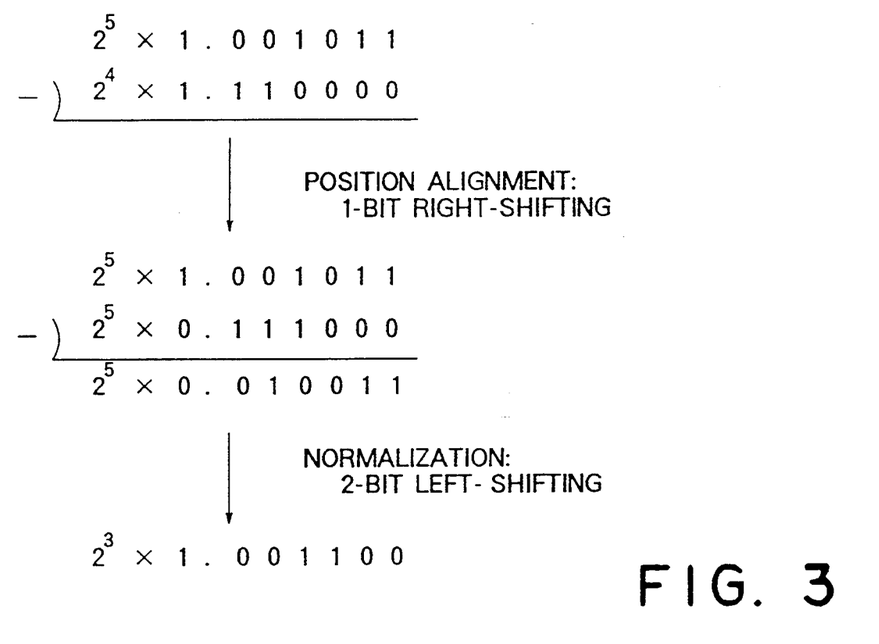

The other of the two cases is such that the addition-subtraction is a true subtraction and the difference between the exponents of both the operands is only one. Such a case is shown in FIG. 3 as an example, in which a one-bit right-shifting operation for a position alignment is first carried out and then the result obtained by the true subtraction is left-shifted more than one bit (two bits in this example) responsive to the result of the subtraction for generating a final result.

In case other than the two cases as described above, the shift amount necessary for the normalization of the fraction is equal to or less than one. This is because: in case of a true addition, the addition either generates a carry from a position at $2^0$ to a position at $2^1$ in the fraction, resulting in a sum of 1x.xxx . . . , in which only a one-bit right-shift is sufficient for the normalization, or generates no carry in the fraction, resulting in a sum of 1.xxx . . . ; and in case of a true subtraction and the difference between the exponents being equal to or more than two, since the subtraction of the fractions would be, for example, (1.xxx ...)−(0.0...0xxx...), the subtraction generates a result either 1.xxx ... or 0.1xxx .... Therefore, the left-shift amount is equal to one bit or less for the normalization.

In view of foregoing, the processing of the floating-point addition-subtraction is categorized in a first and a second cases.

The first case is called Flow A herein in which a barrel left-shift equal to or more than two bits may be necessary in the fraction for a normalization. In this case, the addition-subtraction is a true subtraction and the difference between the exponents of both the operands is zero or one. However, the shift amount necessary for the position alignment before subtraction of the fractions is only one bit or less.

The second case is called Flow B herein in which right- or left-shift amount for the normalization is only one bit or less. In this case, the addition-subtraction is a true addition or a true subtraction and the difference between the exponents of both the operands is equal to or more than two.

Figure 4:
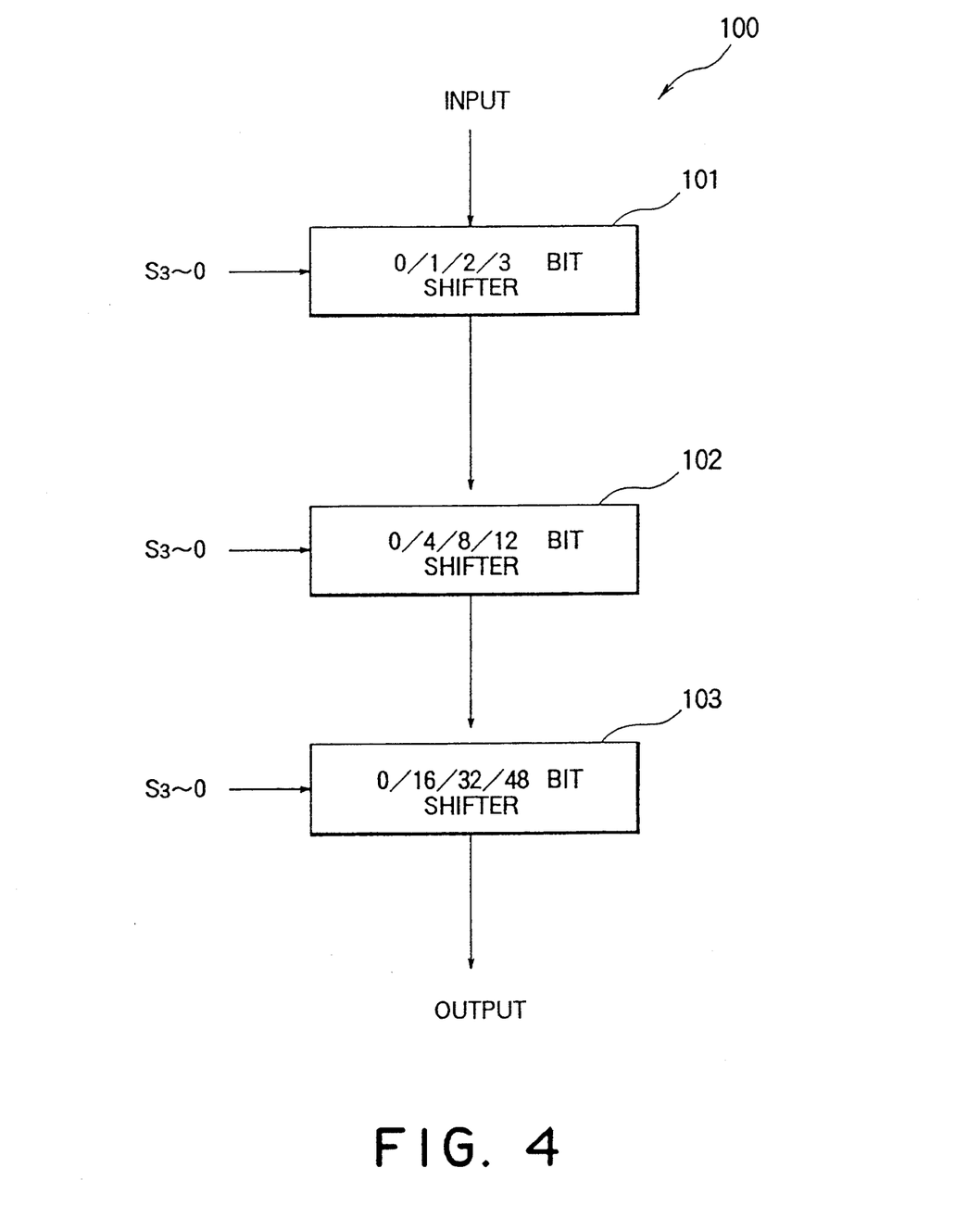
FIG. 4 is a block diagram showing a configuration of an example of a barrel shifter.

A normalization shift or a position alignment shift is carried out by a shifter which functions a bit shift in an amount corresponding to the particular configuration thereof. A barrel shifter for a multibit shifting operation is exemplified in FIG. 4, in which three individual shifters are cascaded in series to form a barrel shifter generally designated at 100. In this example, the first individual shifter 101 functions shifting 0-3 bits, the second individual shifter 102 functions shifting 0, 4, 8 and 12 bits, and the third individual shifter 103 functions shifting 0, 16, 32 and 48 bits as shown in the drawing, each individual shifter 101, 102 and 103 being controlled by respective control bits $S_{3-0}$ in their shift amount. The barrel shifter of FIG. 4 can shift 0-63 bits for a fraction in this configuration by controlling each of the individual shifter 101, 102 and 103. For example, when a 15-bit shift is required, the first individual shifter 101 is controlled to shift 3 bits, the second individual shifter 102 is controlled to shift 12 bits and the third individual shifter 103 is controlled to shift zero bit.

An individual shifter is usually constituted by a matrix of, for example, CMOS transistors. The propagation delay of a shifter assembly, such as a barrel shifter, increases according to the number of the cascaded individual shifter, number of selection of bit-shift in the individual shifter and the upper bit-limit of the fraction of the operand to be shifted. Hence, the propagation delay in a barrel shifter is much larger than that of a one-bit shifter or a shifter for a particular shift amount.

Figure 5:
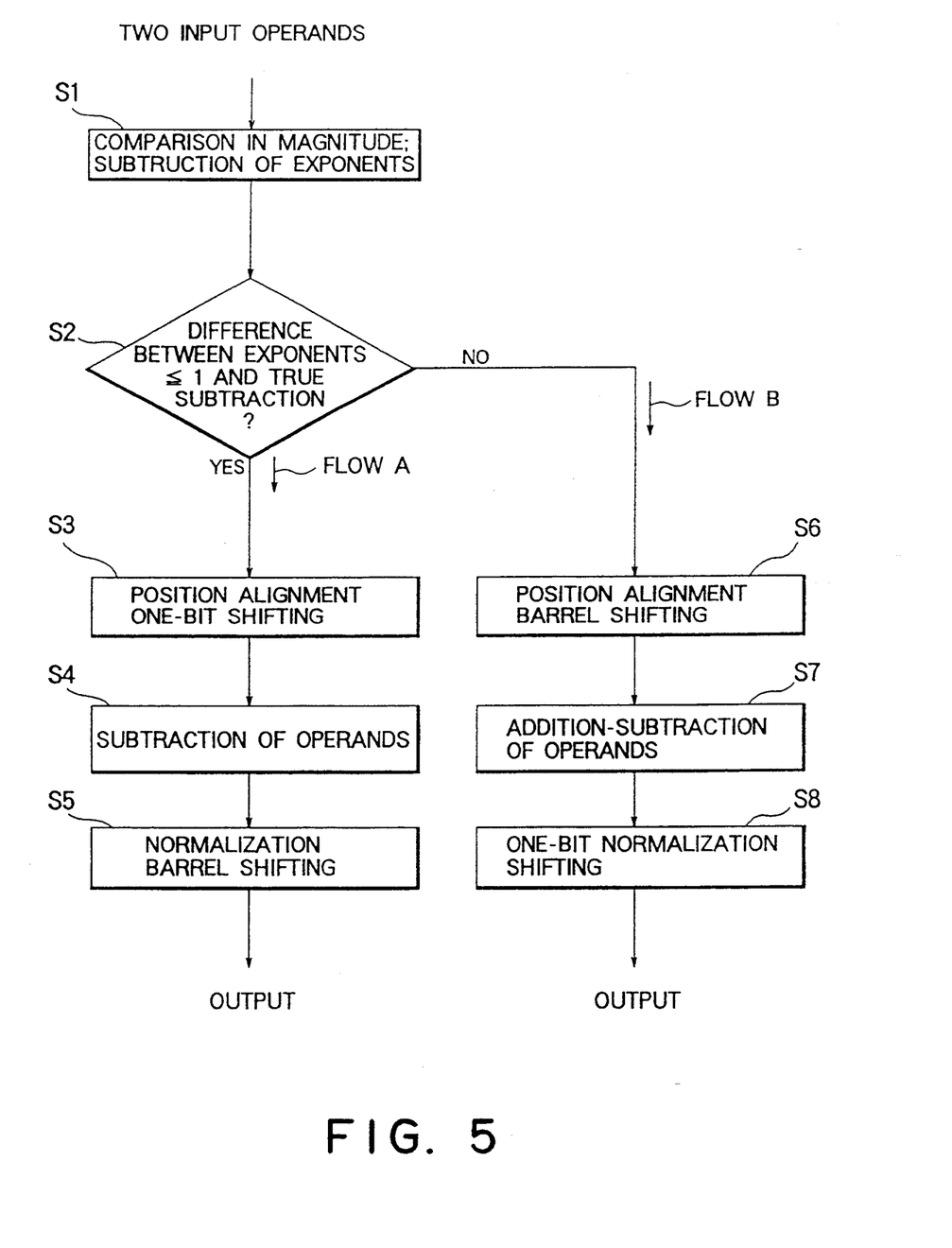
FIG. 5 is a flowchart showing a method for a floating-point addition-subtraction according to an embodiment of the present invention.

Now, the present invention will be described with reference to the drawings. FIG. 5 is a flowchart showing a method for a floating addition-subtraction according to an embodiment of the present invention. In the drawing, two input operands are compared to each other in magnitude and the difference between the exponents of both the operands is calculated (step S1). The difference between the exponents and the calculation type of the addition-subtraction are examined (step S2) and if the difference between the exponents is equal to or less than one and the addition-subtraction is a true subtraction, then right-shifting the smaller fraction equal to or less than one bit for a position alignment (step S3), subtraction of the fractions (step S4), and barrel shifting for a normalization of the fraction obtained by the addition-subtraction (step S5) are consecutively carried out in Flow A.

On the other hand, if the difference between the exponents of both the operands is more than one or if the calculation type is a true addition (step S2), then barrel right-shifting one of the fractions for a position alignment of both the fractions (step S6), addition-subtraction of the fractions (step S7) and normalization-shifting the fraction obtained by the addition-subtraction equal to or less than one bit (step S8) are consecutively carried out in Flow B.

Both the right-shifting operation for the position alignment (step S3) in Flow A and the normalization-shifting operation (step S8) in Flow B require only one-bit shift amount, respectively, so that each of the two shifting operations can be carried out in a one-bit shifter which functions one bit or zero bit shifting operation. The processing time required in a one-bit shifter is quite small as compared to that required in a barrel shifter, as described before, and processing time required in both Flow A and Flow B is substantially determined by the addition-subtraction (step S4 or S7) of the fractions and only one barrel shifting operation (step S5 or S6). Consequently, the processing time required for the floating-point addition-subtraction according to the method shown in FIG. 5 is smaller than that required for a conventional method which requires an addition-subtraction and two barrel shifting operations.

Figure 6:
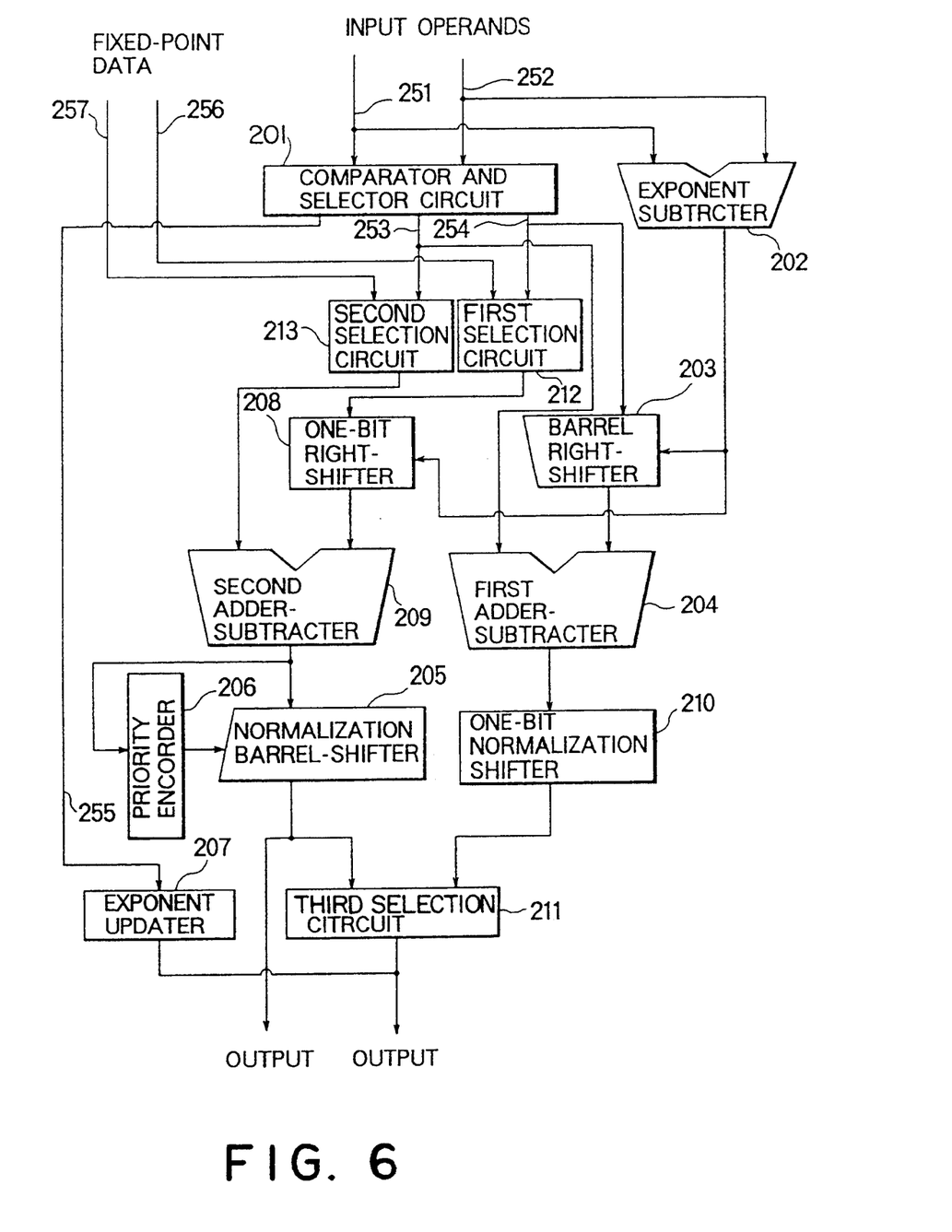
FIG. 6 is a block diagram showing a basic configuration of a floating-point adder-subtracter assembly according to another embodiment of the present invention.

FIG. 6 shows a floating-point adder-subtracter assembly according to an embodiment of the present invention, in which a first, a second and a third selection circuits 211, 212 and 213, a one-bit normalization shifter (first one-bit shifter) 210, a one-bit right-shifter (second one-bit shifter) 208, and a second adder-subtracter 209 are provided additionally to the components of the conventional adder-subtracter assembly of FIG. 1. The components similar to those in FIG. 1 are designated by numerals corresponding to those of FIG. 1 in those lower two digits of the numerals.

Two input operands 251 and 252 are supplied to the comparator and selector circuit 201 and the exponent subtracter 202 which calculates the difference between the exponents of the two input operands 251 and 252. The comparator and selector circuit 201 compares the two input operands 251 and 252 in their magnitude. Based on the result of the comparison, the fraction 253 of the larger input operand is supplied to the third selection circuit 213 and the first adder-subtracter 204, while the fraction 254 of the smaller input operand is supplied to the first selection circuit 212 and the barrel right-shifter (first barrel shifter) 203.

In case of a floating-point computation, the first selection circuit 212 is controlled to output the fraction 254 of the smaller operands selectively from another input 256 of a fixed-point data as described later, while the second selection circuit 213 is controlled to output the fraction 253 of the larger operand selectively from another input 257 of a fixed-point data as described later.

The subsequent procedure will be described separately, as to Flow A operation in which the addition-subtraction is a true subtraction and the difference between the exponents of the operands is equal to or less than one and as to Flow B in which the condition of the addition-subtraction is different from that in Flow A.

In Flow A operation, if the difference between the exponents calculated in the exponent subtracter 202 is equal to one, then the one-bit right-shifter 208 right-shifts, for a position alignment, one bit the operands 254 of the smaller operand outputted from the second selection circuit 212. Otherwise, if the difference between the exponents is zero, then the one-bit right-shifter 208 passes the fraction without a shift. The second adder-subtracter 209 subtracts the output of the one-bit right-shifter 208 from the output of the second selection circuit 213, i.e. the fraction 253 of the larger operand. The normalization barrel shifter (second barrel shifter) 205 shifts the output of the second adder-subtracter 209 for a normalization. The shift amount is specified by the output of the priority encoder 206.

In Flow B operation, the barrel right-shifter 203 shifts the fraction 254 of the smaller operand for a position alignment in a shift amount specified by the output of the exponent subtracter 202. Then, the first adder-subtracter 204 adds or subtracts the output of the barrel right-shifter 203 to or from the fraction 253 of the larger operand. In this flow, normalization can be carried out in a shift amount of equal to or less than one bit. Namely, the normalization is either carried out by right-shifting one bit the output of the adder-subtracter 204 if a carry is generated to the bit $2^1$ in a true addition resulting in a sum of 1x.xxx..., or carried out by left-shifting one bit the output of the adder-subtracter 204 if a borrow is generated from the bit 2° in a true subtraction resulting in a difference of 0.1xxx.... The normalization is carried out in the one-bit normalization shifter 210.

The first selection circuit 211 receives the output of the normalization barrel shifter 205 and the one-bit normalization shifter 210, and functions in such a way that: the third selection circuit 211 outputts selectively the output of the normalization barrel shifter 205 if the difference between the exponents of both the input operand is equal to or less than one and the addition-subtraction is a true subtraction; and the third selection circuit 211 outputts selectively the output of the normalization one-bit shifter 210 if the difference between the exponents is equal to or more than two or if the addition-subtraction is a true addition.

The exponent updater 207 receives the exponent 255 of the larger input operand from the comparator and selector circuit 201 and updates the exponent by adding or subtracting the shift amount of the normalization carried out by the normalization barrel shifter 205 in Flow A or by the one-bit normalization shifter 210 in Flow B to or from the input of the exponent updater 207. The floating-point addition-subtraction is carried out in this way.

Next, the fixed-point addition-subtraction carried out in the floating-point adder-subtracter assembly of FIG. 6 will be described. The fixed-point addition-subtraction may be carried out in the first adder-subtracter 204 as well as in the second adder-subtracter 209. When fixed-point addition-subtraction is to be carried out in the second adder-subtracter 209, a first and second data 256 and 257 of a fixed-point number having a certain format are inputted to the first and second selection circuits 212 and 213, respectively. The first selection circuit 212 outputs a first fixed-point data 256 to the one-bit right-shifter 208 selectively from other input 254 from the comparator and selector circuit 201, while the third selection circuit 213 outputts a second fixed-point data 257 to the second adder-subtracter 209 selectively from the input 253 from the comparator and selector circuit 210. The one-bit right shifter 208 passes the data inputted from the second selection circuit 212 without processing. Hence, the second adder-subtracter 209 receives the first and the second fixed data 256 and 257 and carries out a fixed-point addition-subtraction. The output of the second adder-subtracter 209 is passed through the normalization barrel shifter 205 without processing.

On the other hand, the first adder-subtracter 204 may be also operated to carry out a fixed-point addition-subtraction, in which input fixed-point operands 251 and 252 are passed through the comparator and selector circuit 201 as a fixed-point data without processing. The barrel right-shifter 203 is controlled to pass the data without processing. Hence, the first adder-subtracter 204 receives the fixed-point input operands 251 and 252 and carries out a fixed-point addition-subtraction. The one-bit normalization shifter 210 passes the output of the first adder-subtracter 204 without processing, and the third selection circuit 211 selectively outputts the output of the one-bit normalization shifter 210. The adder-subtracter assembly of FIG. 6 comprises two adder-subtracters 204 and 209 for an addition-subtraction of fractions, hence these two adder-subtracters 204 and 209 can be operated in parallel to function for a fixed-point addition-subtraction, respectively, resulting in a through-put two times higher than in the conventional floating-point adder-subtracter having only one adder-subtracter.

The floating-point adder-subtracter of the embodiment of FIG. 6 as described above selectively outputts the output in Flow A operation or in Flow B operation depending on the condition of the difference between the exponents of the operands and on the condition whether the addition-subtraction is a true addition or a true subtraction. Flow A operation includes right-shifting in an amount equal to or less than one bit for a position alignment, an addition-subtraction of the fraction and a normalization barrel left-shifting, while Flow B operation includes right-shifting the fraction for a position alignment, an addition-subtraction of the fraction and normalization shifting in an amount equal to or less than one bit, hence both the Flows A and B requiring only one barrel shifting operation or multibit shifting operation as compared to the two barrel shifting operations in a conventional adder-subtracter assembly. Thus the adder-subtracter of FIG. 6 can carry out a floating-point addition-subtraction faster than the conventional adder-subtracter assembly.

Although the position alignment shifting operation is carried out to the fraction of the smaller operands in the embodiments described above, it is not limited to such an embodiment, since the position alignment shift can be carried out to the larger operands instead of the smaller operand.

Since above embodiments are described only for examples, the present invention is not limited to such embodiments and it will be obvious for those skilled in the art that various modifications or alterations can be easily made based on the above embodiments under the scope of the, present invention.

What is claimed is:

1. A floating-point and fixed-point adder-subtractor assembly comprising:
   a comparator and selector circuit comparing a first operand including a first exponent and a first fraction with a second operand including a second exponent and a second fraction, respectively, for determining which of the first and second operands has a larger magnitude;
   an exponent subtracter for calculating a difference between the first and second exponents;

a first barrel shifter for shifting one of the first and second fractions in an amount equal to the difference for a first position alignment of the first and second fractions;

a first adder-subtracter for adding-subtracting the first and second fractions for generating a third fraction after the first and second fractions are positioned-aligned by the first barrel shifter;

a first one-bit shifter for shifting the third fraction in an amount equal to or less than one bit for a first normalization;

a first selection circuit for selectively outputting a first fixed-point data or one of the first and second fractions supplied from the comparator and selector circuit;

a second selection circuit for selectively outputting a second fixed-point data or the other of the first and second fractions not supplied to the first selection circuit;

a second one-bit shifter for shifting the one of the first and second fractions supplied from the first selection circuit in an amount equal to the difference for a second position alignment of the first and second fractions;

a second adder-subtracter for adding-subtracting the first and second fractions for generating a fourth fraction after the first and second fractions are positioned-aligned by the second one-bit shifter, the second adder-subtracter adding-subtracting the first fixed-point data and second fixed-point data in a fixed-point adding-subtracting mode;

a second barrel shifter for shifting the fourth fraction in an amount corresponding to the fourth fraction for a second normalization;

a third selection circuit for selecting one of the outputs of the first one-bit shifter and second barrel-shifter; and an exponent updater for generating a third exponent for the fourth fractions.

2. The floating-point and fixed-point adder-subtracter of claim 1 wherein the first adder-subtracter adds-subtracts a third fixed-point data and a fourth fixed-point data in the fixed-point adding-subtracting mode independently of the second adder-subtracter.

3. The floating-point and fixed-point adder-subtracter assembly of claim 2 wherein the comparator and selector circuit receives and passes the third and fourth fixed-point data.

4. An apparatus for use in a floating-point and fixed-point adder-subtractor assembly comprising:

a first operand input supplying a first operand, the first operand including a first exponent and a first fraction;

a second operand input supplying a second operand, the second operand including a second exponent and a second fraction;

first and second fixed-point data inputs supplying first and second fixed-point data operands;

an adder-subtracter having first and second inputs and an output, the adder-subtracter for adding-subtracting operands;

comparator and selector circuit means, coupled to the first and second operand inputs, receiving the first and second operands, comparing the first fraction with the second fraction and comparing the first exponent with the second exponent for determining which of the first and second operands is the larger operand and which of the first and second operands is the smaller operand, for outputting the smaller operand on a first output and outputting the larger operand on a second output;

first selector means having a first input coupled to the first fixed-point data input for receiving the first fixed-point data operand, a second input coupled to the first output of the comparator and selector circuit means for receiving the smaller operand, and a first output for selectively outputting the first fixed-point data operand or the smaller operand to the first input of the adder-subtracter;

second selector means having a first input coupled to the second fixed-point data input for receiving the second fixed-point data operand, a second input coupled to the second output of the comparator and selector circuit means for receiving the larger operand, and a first output for selectively outputting the second fixed-point data operand or the larger operand to the second input of the adder-subtracter;

a shifter, coupled between one of the first and second inputs of the adder-subtracter and one of the first and second outputs of the comparator and selector circuit means, for selectively performing a position alignment, wherein the comparator and selector circuit is disposed prior to an adder-subtracter for determining a larger and smaller operand prior to the addition and subtraction operation and wherein first and second selector circuits allow the same adder-subtracter to be utilized for both fixed-point and floating-point operations, whereby an efficient structure is realized.

* * * * *